US010943412B2

(12) United States Patent
Godet et al.

(10) Patent No.: US 10,943,412 B2
(45) Date of Patent: Mar. 9, 2021

(54) METHOD FOR REMOTELY LOADING DIGITAL DATA TO AN ELECTRONICS UNIT FOR MEASURING OPERATING PARAMETERS OF A MOTOR VEHICLE WHEEL, BY TRANSMISSION OF MECHANICAL WAVES (71) Applicants: CONTINENTAL AUTOMOTIVE FRANCE, Toulouse (FR); CONTINENTAL AUTOMOTIVE GmbH, Hannover (DE)

(72) Inventors: Sylvain Godet, Saint-Cezert (FR); Arthur Fouss, Toulouse (FR)

(73) Assignees: CONTINENTAL AUTOMOTIVE FRANCE, Toulouse (FR); CONTINENTAL AUTOMOTIVE GMBH, Hannover (DE)

(*) Notice: Subject to any disclaimer, the term of this patent is extended or adjusted under 35 U.S.C. 154(b) by 658 days.

(21) Appl. No.: 15/493,876

(22) Filed: Apr. 21, 2017

(65) Prior Publication Data
US 2017/0316623 A1    Nov. 2, 2017

(30) Foreign Application Priority Data
May 2, 2016  (FR) ...................... 1653934

(51) Int. Cl.
*G07C 5/00* (2006.01)
*B60C 23/04* (2006.01)
(Continued)

(52) U.S. Cl.
CPC .......... *G07C 5/008* (2013.01); *B60C 23/0471* (2013.01); *B60C 23/0479* (2013.01);
(Continued)

(58) Field of Classification Search
CPC .... G07C 5/008; G07C 5/0841; G07C 5/0816; H04W 88/02; B60C 23/061; B60C 23/06; B60C 23/0479; B60C 23/0471
See application file for complete search history.

(56) References Cited

U.S. PATENT DOCUMENTS 4,845,649 A    7/1989   Eckardt et al.
7,652,561 B2   1/2010   Pimort
(Continued)

FOREIGN PATENT DOCUMENTS

CN    1950221    4/2007
CN    102303489  1/2012
(Continued)

OTHER PUBLICATIONS

FR Search Report, dated Dec. 15, 2016, from corresponding FR application.

*Primary Examiner* — Hunter B Lonsberry
*Assistant Examiner* — Mathew Franklin Gordon
(74) *Attorney, Agent, or Firm* — Nixon & Vanderhye (57) ABSTRACT

Disclosed is a method for remotely loading digital data to an electronics unit for measuring operating parameters of a wheel of a motor vehicle, the remote loading being carried out by a remote loading tool external to the wheel. The method includes the positioning of the external remote loading tool in the proximity of the wheel at least, emission of at least one frame of mechanical waves by the external remote loading tool toward the electronics unit, the waves being representative of the data to be remotely loaded, reception of at least the frame of mechanical waves by the electronics unit via the mechanical parameter measurement sensor, and the conversion of the mechanical waves into electrical signals and then into digital signals containing the remotely loaded data in digital form, and the storage of the remotely loaded data in the electronics unit.

19 Claims, 3 Drawing Sheets (51) Int. Cl.
*G07C 5/08* (2006.01)
*H04W 88/02* (2009.01)
*B60C 23/06* (2006.01)

(52) U.S. Cl.
CPC .......... *B60C 23/06* (2013.01); *B60C 23/061* (2013.01); *G07C 5/0816* (2013.01); *G07C 5/0841* (2013.01); *H04W 88/02* (2013.01)

(56) References Cited

U.S. PATENT DOCUMENTS

| | | |
|---|---|---|
| 9,122,423 B2 | 9/2015 | McIntyre et al. |
| 2003/0216845 A1* | 11/2003 | Williston .............. B60C 23/003 701/36 |
| 2007/0241871 A1 | 10/2007 | Pimort |
| 2008/0284575 A1* | 11/2008 | Breed ................. B60C 23/0493 340/438 |
| 2012/0050029 A1 | 3/2012 | Yu et al. |
| 2014/0165026 A1 | 6/2014 | McIntyre et al. |
| 2015/0202932 A1* | 7/2015 | Kessler .................. B60C 23/04 340/445 |
| 2017/0028796 A1* | 2/2017 | Patel .................. B60C 23/0408 |

FOREIGN PATENT DOCUMENTS

| | | |
|---|---|---|
| CN | 103587357 | 2/2014 |
| CN | 104995044 | 10/2015 |
| DE | 3446248 A1 | 6/1986 |
| EP | 1 602 908 A2 | 12/2005 |
| GB | 2 500 697 A | 10/2013 |
| WO | 2008/063844 A2 | 5/2008 |

\* cited by examiner

METHOD FOR REMOTELY LOADING DIGITAL DATA TO AN ELECTRONICS UNIT FOR MEASURING OPERATING PARAMETERS OF A MOTOR VEHICLE WHEEL, BY TRANSMISSION OF MECHANICAL WAVES

FIELD OF THE INVENTION

The present invention relates to a method for remotely loading digital data to an electronics unit for measuring operating parameters of a motor vehicle wheel, by transmission of mechanical waves.

BACKGROUND OF THE INVENTION

The present invention also relates to an assembly comprising an external remote loading tool and a motor vehicle wheel for the application of this remote loading method.

The present invention relates to the field of motor vehicles, and notably to the field of the monitoring of the parameters of tires of motor vehicle wheels by an electronics unit incorporated in each wheel.

There are known systems for the detection and monitoring of vehicle wheel parameters. A motor vehicle wheel equipped with a system of this type is shown (in a schematic way) in FIG. 1.

Figure 1:
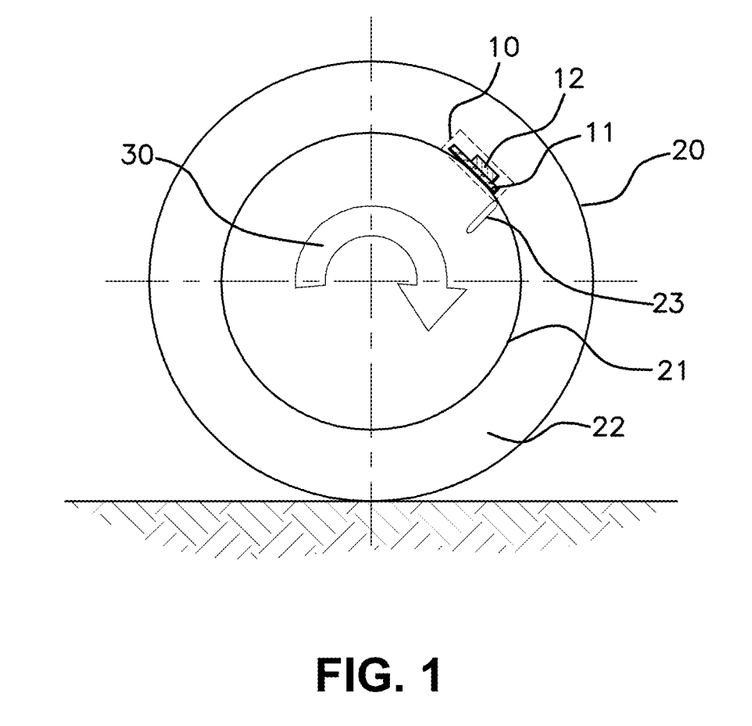
FIG. 1 is a schematic representation of a face-on view of a wheel equipped with an electronics unit for measuring operating parameters of the tire of the motor vehicle wheel, this electronics unit being of the prior art type, although data may be remotely loaded into this electronics unit by means of a method for remote loading of digital data into an electronics unit according to the present invention.

In FIG. 1, the wheel 20 is equipped with a rim 21 and a tire 22. The wheel 20 is configured to revolve around a bearing axis as shown by arrow 30. The system for the detection and monitoring of vehicle wheel parameters takes the form of an electronics unit 10, commonly called a wheel unit, outlined in broken lines.

The electronics unit 10 is shown in FIG. 1 as being mounted against the rim 21, but this electronics unit may be mounted in the tire 22 of the wheel 20, for example on its inner circular periphery under the tread, on a sidewall of the tire or on a tire inflation valve 23 near the rim 21, being placed on a portion of the valve 23 lying inside the tire 22.

Each electronics unit 10 communicates with a central unit for monitoring the vehicle wheels, installed in the vehicle and placed remotely from the electronics unit 10 of each wheel.

The electronics unit 10 for measuring at least one operating parameter of the wheel, also commonly known as a "wheel unit" and referred to hereinafter as an "electronics unit", is provided with a radial acceleration sensor 12 which measures the rotation speed of the wheel 20. The radial acceleration sensor 12 measures the radial acceleration that it undergoes when the wheel 20 revolves around the bearing axis.

This is because a knowledge of the rotation speed of the wheel is important for the operation of roadholding assistance systems or anti-wheel locking systems, such as the anti-wheel locking system known by the abbreviation ABS or the system for electronic control of the dynamic behavior of the vehicle known by the abbreviation ESP.

The electronics unit 10 comprises a support 11 for the radial acceleration sensor 12 shown in FIG. 1 as extending in a plane tangential to the rim 21, the radial acceleration sensor 12 extending parallel to the support 11. The support 11 or the radial acceleration sensor 12 may be inclined relative to a plane tangential to the rim 21.

Although this is not shown in FIG. 1, the electronics unit 10 incorporated into the wheel 20 also comprises a pressure sensor for sensing the pressure of the tire 22 fitted on the wheel 20, and, advantageously, a temperature sensor, neither the pressure sensor nor the temperature sensor being shown in this figure. The pressure sensor of the tire 22 monitors the pressure of the tire 22 at regular intervals at least, and transmits this information to the aforementioned central wheel monitoring unit located remotely from the wheels 20.

Finally, the electronics unit 10 comprises a microprocessor, an antenna for receiving low frequency signals, forming a low frequency receiving stage, and an antenna for emitting radiofrequency signals, forming a radiofrequency emission stage. A battery integrated into the electronics unit may supply all the aforesaid components of the electronics unit.

Each electronics unit, or wheel unit, communicates with the central wheel monitoring unit, which is equipped with a radiofrequency receiving antenna, notably for receiving information from each electronic wheel unit, and with a microprocessor-based computer, this central monitoring unit being supplied by a battery of the vehicle and possibly including an element for low frequency emission toward the electronics units.

In a known way, the pressure sensors and radial acceleration sensors of the electronics units of each wheel may monitor, respectively, the pressure inside the tire associated with the wheel, the rotation speed and the rotational acceleration of the wheel. Each electronics unit sends these two types of measurements made to the central monitoring unit via radiofrequency signals. The central monitoring unit is adapted to decode and process the received radiofrequency signals.

At present, the architecture used in electronic wheel units does not enable them to be reprogrammed after they have been mounted on their motor vehicle wheels. However, one or more updates of the electronics unit are necessary in order to correct any software faults or to add new functionality.

Any reprogramming of the wheel unit requires the dismantling of not only the wheel but also the electronic part of the wheel unit, in order to access the electronics embedded in the wheel unit. This can only be done by destroying the protection provided for the electronic part, as a result of which the mechanical integrity of the electronic part is no longer assured.

If reprogramming is required, the electronics unit of a wheel is replaced, leading to excessive financial costs due to the method of dismantling the wheel by a skilled worker and its replacement with a new electronics unit.

A number of other solutions for reprogramming the electronic wheel units have therefore been proposed. Thus, it has been proposed that this reprogramming should be performed via a two-way wireless link using the low frequency receiving stage and the radiofrequency emission stage.

It has been found that reprogramming the electronics unit is difficult or even impossible to achieve regardless of the remote loading mode, both when the motor vehicle is running and when it is stationary.

In fact, a remote loading method using the low frequency and radiofrequency stages as reprogramming means is virtually ruled out by international regulations. According to these regulations, the time interval of electromagnetic radiation emission must be strictly periodic, and continuous emission is prohibited.

In the case of periodic emission, each transmission must be shorter than a second, and the silent period must be equivalent to thirty times the transmission time, or greater than ten seconds. Moreover, cumulative emission of more than two seconds per hour is prohibited.

Consequently these standards make it difficult to carry out reprogramming requiring a large data transfer that may continue for five to ten minutes of emission at low frequency and radiofrequency, not allowing for the silent periods which considerably increase the remote loading time.

The problem underlying the present invention is that of carrying out remote loading of digital data for reprogramming the electronics unit carried by each wheel of a motor vehicle, notably for the purpose of updating the program stored in the electronics unit, without the removal of the electronics unit by a skilled or unskilled operator, without the use of electromagnetic radiation, and with the shortest possible remote loading time to comply with the current emission standards.

SUMMARY OF THE INVENTION

To this end, the present invention relates to a method for uploading digital data to an electronics unit for measuring operating parameters of a motor vehicle wheel, the remote loading being carried out by a remote loading tool external to the wheel, the electronics unit comprising a microprocessor, a memory and at least one sensor for measuring a mechanical parameter relating to the wheel, the external remote loading tool emitting data that are received by the electronics unit, characterized in that the method comprises the following steps:
- the positioning of the external remote loading tool in the proximity of the wheel at least,
- the emission of at least one frame of mechanical waves, by means of the external remote loading tool, toward the electronics unit, these waves being representative of the data to be remotely loaded,
- the reception of at least said frame of mechanical waves by the electronics unit, via the mechanical parameter measurement sensor, and the conversion of the mechanical waves into electrical signals and then into digital signals containing the remotely loaded data in digital form,
- the storage of the remotely loaded data in the electronics unit.

The present invention therefore proposes the application of a solution which reduces the use of electromagnetic means of communication, in order to limit the constraints due to international and European regulations.

The technical effect of the present invention is that, notably, the electronics unit can be reprogrammed without dismantling it and as efficiently as possible while complying with the current electromagnetic emission standards. The method according to the invention may be used for the wireless remote loading of data without the use of any emission of electromagnetic radiation.

The software elements required for the application of the method according to the present invention are easily integrated into the architecture of the existing electronic wheel units, and therefore the application of the method does not require a redesign of the electronic wheel units. This application does not require the addition of electronic components to the electronics unit known as a wheel unit. In the case of the design of a low-cost electronics unit, the elimination of the low frequency stage used for receiving data from external sources may be considered.

This method, according to the present invention, can protect the body of the software, providing protection from piracy.

According to two preferred embodiments of the present invention, the mechanical waves transmitted by the external remote loading tool relate to acoustic vibrations detected and received by a radial acceleration sensor of the wheel, or to pressure variations transmitted to the wheel and detected and received by a sensor of the pressure of the tire of the wheel, the radial acceleration sensor or the tire pressure sensor being the mechanical parameter measurement sensor of the electronics unit.

This requires only one reprogramming of the electronics unit and its accelerometric sensor or its tire pressure sensor, to provisionally suspend its function of monitoring the rotation speed of the wheel or the pressure of the tire, in order to give it a function of receiving and remotely loading data transmitted in at least one frame of mechanical waves.

The function of the acceleration sensor or pressure sensor is then changed from its initial use. The acceleration sensor is no longer used for measuring the movement of the vehicle on the basis of the speed and acceleration of the wheel, but is used for transferring data by means of the vibrations detected by the sensor. The same applies to the pressure sensor, in relation to pressure vibrations transmitted to it by the remote loading tool.

The tool vibrates with the rhythm of the data to be transmitted, with a data transmission speed and a specific message indicating that the mechanical pulsations must be converted by digital conversion into electrical signals and then into digital signals.

Thus, in the case of an electronics unit equipped with an acceleration sensor, the electronics unit detects the vibrations by means of the acceleration sensor. These vibrations are then converted into electrical signals, and are then digitized in an analog to digital converter. The configuration of the analog to digital converter is defined specifically for this application.

Advantageously, the method comprises the step of preliminary reception by the external remote loading tool of data to be remotely loaded in the form of digital signals and conversion of the digital signals by the external remote loading tool into mechanical waves that can be received by the mechanical parameter measurement sensor. The data to be remotely loaded are initially created in the form of digital signals which the remote loading tool or a control unit associated with this remote loading tool converts into a frame of mechanical waves, before transfer to the electronics unit via its sensor for sensing a mechanical parameter.

Advantageously, because the microprocessor and the mechanical parameter measurement sensor communicate in a first configuration mode for standard operation before the remote loading of data between the external remote loading tool and the electronics unit, the method comprises, before the step of emitting said at least one frame of mechanical waves representative of the data to be remotely loaded, a step of emitting at least one frame of mechanical waves for the configuration of the mechanical parameter measurement sensor of the electronics unit in a second configuration mode suitable for the reception of mechanical waves.

The two functions carried out by a mechanical parameter measurement sensor, that is to say, on the one hand, its normal operation of measuring a parameter of the wheel and, on the other hand, the remote loading of data in the form of various mechanical waves, may differ, for example, in terms of the measurements made and the intervals of transmission of the measurements to the electronics unit. It may therefore be necessary for the measurement sensor to be adapted in advance to the auxiliary function of remote loading that it is to carry out, to provide optimal reception and transmission of data between the remote loading tool and the measurement sensor on the one hand, and between the measurement sensor and the electronics unit on the other hand.

Advantageously, a plurality of frames of mechanical waves representative of the data to be remotely loaded are emitted by the external remote loading tool toward the electronics unit, these frames of mechanical waves being fragmented according to the size of the memory of the electronics unit.

Advantageously, during emission, the electronics unit communicates directly or indirectly by return with the external remote loading tool. This enables it to send a message indicating correct reception of the remotely loaded data. "Directly" means that it corresponds with the remote loading tool, and "indirectly" means that it corresponds with a control unit of the remote loading tool without passing through the remote loading tool.

The invention also relates to an assembly comprising an external remote loading tool and a motor vehicle wheel, the wheel comprising a tire and an electronics unit for measuring at least one operating parameter of the wheel, a remote loading of digital data taking place between the remote loading tool and the electronics unit, the remote loading tool being external to the wheel, the electronics unit comprising a microprocessor, a memory and at least one sensor for measuring a mechanical parameter relating to the wheel, the assembly being characterized in that it uses such a method for remote loading digital data, the external remote loading tool comprising elements for creating and emitting mechanical waves relating to the mechanical parameter measured by the sensor on the basis of the digital data to be remotely loaded, the mechanical parameter measurement sensor receiving the emitted mechanical waves and communicating them to the microprocessor, the microprocessor comprising elements for converting the mechanical waves received by the sensor into digital signals representing the remotely loaded digital data and elements for storing the remotely loaded digital data.

The method according to the present invention may be executed by any operator, skilled or unskilled. The remote loading tools that can be used may be of different types and may be easily available since they are already employed for other uses. This provides a high degree of flexibility in the application of the method according to the invention: the external remote loading tool may or may not be of a special-purpose type, being, for example, either a dedicated tool or a cellphone adapted to emit vibrations and receive digital data. Such remote loading tools are compatible with the microprocessors already installed in, or currently being integrated into, electronics units.

According to two preferred embodiments of the present invention, the mechanical parameter measurement sensor is a radial acceleration sensor of the wheel or a sensor for measuring the pressure of the tire of the wheel.

According to the first preferred embodiment, if the mechanical parameter measurement sensor is the acceleration sensor of the electronics unit, the external remote loading tool is a cellphone, a vibrating member controlled by a central monitoring unit or a special-purpose tool comprising elements for creating and transmitting vibration waves, the cellphone, the vibrating member or the special-purpose tool being applied against the wheel, the electronics unit of the wheel comprising elements for emitting radiofrequency radiation by return toward the central monitoring unit or via a diagnostic connection with the special-purpose tool or emission elements using technology for wireless communication with the cellphone.

Where remote loading of data takes place by means of a cellphone, remote loading notifications and data may be received via the internet.

According to the second preferred embodiment, if the mechanical parameter measurement sensor is the pressure sensor of the electronics unit, for example a sensor comprising a membrane, the external remote loading tool is an external compressor connected to an inflation valve of the tire of the wheel, the external compressor being controlled by an element for creating successive pressure variations representative of the digital data to be remotely loaded.

BRIEF DESCRIPTION OF THE DRAWINGS

Other features, objects and advantages of the present invention will be apparent from a perusal of the following detailed description and the attached drawings provided as non-limiting examples, in which.

DETAILED DESCRIPTION OF THE INVENTION

In the following text, reference is made to all the figures in combination. If reference is made to one or more specific figures, these figures are to be considered in combination with the other figures for the purpose of identifying the designated reference numerals.

Figure 2:
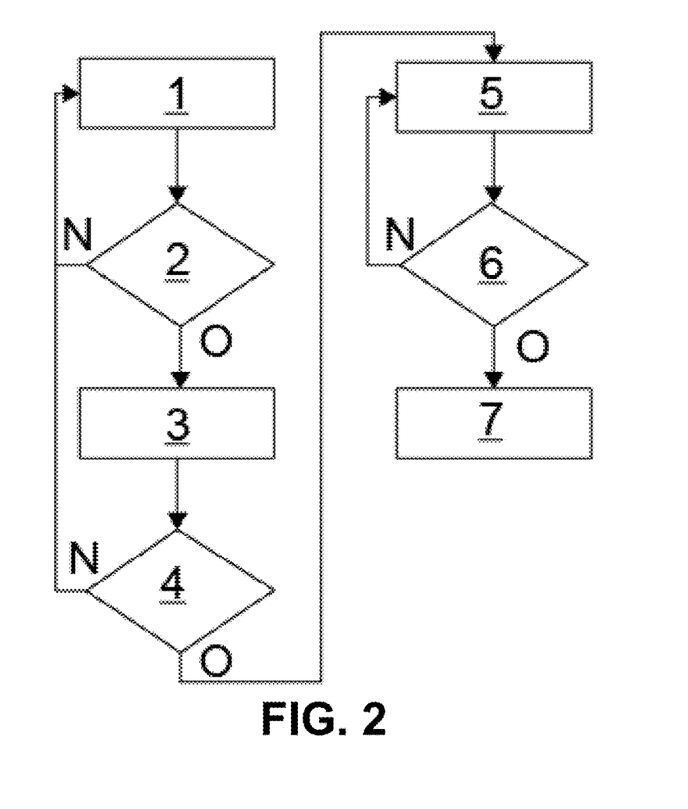
FIG. 2 is a schematic representation of a flow diagram detailing the steps of an embodiment of the method for remote loading of digital data into an electronics unit according to the present invention.
Figure 4:
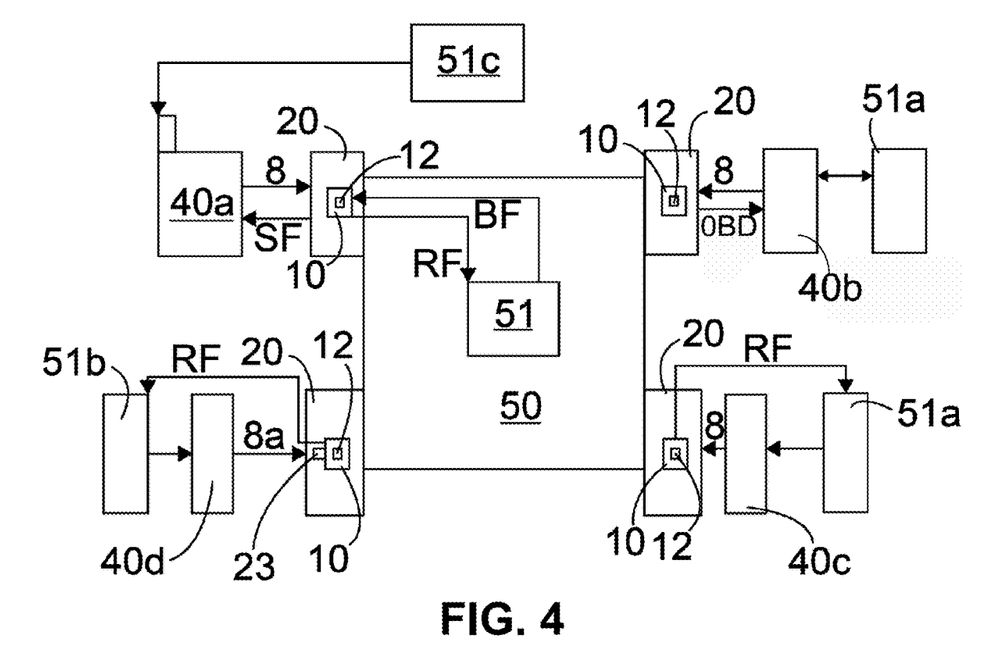
FIG. 4 shows a motor vehicle, each wheel of which is characterized by its electronics unit incorporated into the wheel with a specific remote loading tool, with the aim of showing various remote loading tools and remote loading modes that may fall within the scope of the present invention.

With reference to all the figures, but more particularly to FIGS. 2 and 4, FIG. 2 showing a flow diagram detailing the steps of an embodiment of the method according to the invention and FIG. 4 showing a number of embodiments of an assembly formed of an external remote loading tool 40a to 40d and an electronics unit 10 for measuring operating parameters of a wheel 20 of a motor vehicle 50, the present invention relates to a method for remote loading digital data into an electronics unit 10 of a wheel 20. These digital data may be used for reprogramming the electronics unit 10.

It should be borne in mind that some steps of the method shown in FIG. 2 are not essential for the application of the method according to the present invention. The steps of the method will be detailed, not in chronological order but according to their importance for the application of the method according to the invention. It should also be borne in mind that other steps of the method are not explicitly illustrated in FIG. 2.

The remote loading of digital data is carried out by a remote loading tool 40a to 40d external to the wheel 20, a number of embodiments of which are shown in FIG. 4, and are detailed below. The electronics unit 10 comprises a microprocessor, a memory and at least one sensor 12 for measuring a mechanical parameter relating to the wheel 20, the external remote loading tool 40a to 40d emitting data that are received by the electronics unit 10.

According to the invention, the method comprises a step of positioning the external remote loading tool 40a to 40d at least in the proximity of the wheel 20 incorporating the electronics unit 10. This step is followed by the emission of at least one frame of mechanical waves 8, 8a by the external remote loading tool 40a to 40d toward the electronics unit 10, these waves being representative of the data to be remotely loaded.

This step of emission bears the reference 5 in FIG. 2. The frame of mechanical waves 8, 8a contains mechanical waves specifically adapted to be detected by a sensor present in the electronics unit 10, for example, but not exclusively, by a radial acceleration sensor 12 or by a pressure sensor for sensing the pressure of the tire 22 of the vehicle wheel 20.

Figure 3:
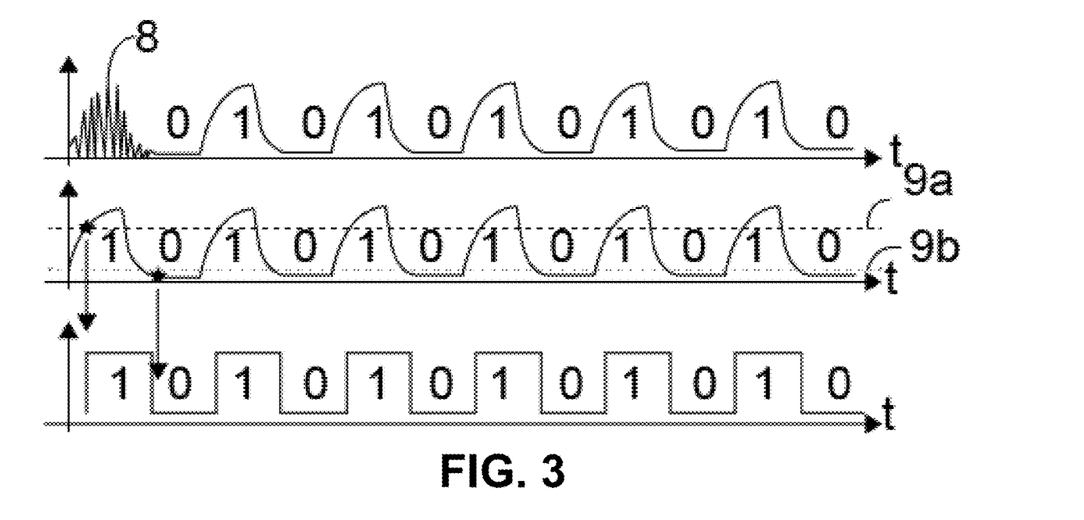
FIG. 3 shows three curves, of which a first curve is a frame of mechanical waves sent by an external remote loading tool to an electronic wheel unit of a motor vehicle, these mechanical waves being detected by a radial acceleration sensor, converted into electrical signals according to a second curve and digitized according to a third curve in the electronics unit, in conformity with an embodiment of the method according to the invention.

The method comprises a step in which at least said frame of mechanical waves 8, 8a is received by the electronics unit 10, via the mechanical parameter measurement sensor 12. This step is followed by a step of conversion of the mechanical waves into electrical signals and then into digital signals, as shown in FIG. 3, containing the remotely loaded data in digital form. The last of the essential steps is the storage of the remotely loaded data in the electronics unit 10.

According to a first preferred embodiment of the present invention, the mechanical waves transmitted by the external remote loading tool 40a to 40d relate to acoustic vibrations detected and received by a radial acceleration sensor 12 of the wheel 20. In this case, the radial acceleration sensor 12 is the mechanical parameter measurement sensor of the electronics unit 10, and the mechanical parameter measurement sensor is a vibration which is advantageously acoustic.

In normal operation, the radial acceleration sensor 12 detects variations in gravitational force due to the rotation of the wheel 20, plotting a sine wave whose period yields the rotation speed as a function of the diameter of the wheel 20. However, the radial acceleration sensor 12 may be very capable of detecting vibrations when it is switched to a special vibration detection mode. In this case, the external remote loading tool 40a to 40d may be applied against the wheel 20.

According to a second preferred embodiment of the present invention, the mechanical waves transmitted by the external remote loading tool 40a to 40d relate to variations in pressure transmitted to the wheel 20, detected and received by a pressure sensor for sensing the pressure of the tire 22 of the wheel 20. In this case, the pressure sensor of the tire 22 is the mechanical parameter measurement sensor 12 of the electronics unit 10, and the mechanical parameter is a pressure. This is because, in FIG. 4, the reference 12 may denote either a radial acceleration sensor or a pressure sensor.

The method according to the invention may comprise a step of preliminary reception by the external remote loading tool 40a to 40d of data to be remotely loaded in the form of digital signals and conversion of the digital signals by the external remote loading tool 40a to 40d into mechanical waves that can be received by the mechanical parameter measurement sensor 12.

The external remote loading tool may be simply a member for creating mechanical waves 40c, 40d, controlled by an element for creating pressure variations 51b or by a central monitoring unit 51a. For external remote loading tools 40b to 40d, a central monitoring unit 51a or 51b, in the form of an element 51a for creating vibrations or an element 51b for creating pressure variations, for example, may be the source of the data to be remotely loaded in digital form, these data being sent to the external remote loading tool 40b to 40d as pulses enabling it to create mechanical waves.

The microprocessor of the electronics unit 10 and the mechanical parameter measurement sensor 12 operate in a first configuration mode for standard operation before the remote loading of data between the external remote loading tool 40a to 40d and the electronics unit 10 at a specific data rate. For example, a radial acceleration sensor 12 is programmed to monitor the gravitational force by making measurements and then sending these measurements to the microprocessor at regular predetermined time intervals, at a data rate specific to this normal operation configuration.

In this example, it is useful to reprogram the radial acceleration sensor to enable it to detect the vibrations sent to it by the external remote loading tool 40a to 40c, and to adjust the measurement time intervals to make them match the period of the vibration waves.

For this purpose, the method comprises, before the step of emitting said at least one frame of mechanical waves 8, 8a representative of the data to be remotely loaded, this step bearing the reference 5 in FIG. 2, a step of emitting at least one frame of mechanical waves for the configuration of the mechanical parameter measurement sensor 12 of the electronics unit 10 in a second configuration mode suitable for the reception of mechanical waves. This step of emission bears the reference 1 in FIG. 2.

This step of emission bearing the reference 1 may take place at the same data rate as that of the first standard operation configuration mode of the acceleration sensor and microprocessor of the electronics unit 10.

Also with reference to FIG. 2, in combination with FIG. 4, interrogation may then take place to determine whether or not the configuration frame of mechanical waves has actually been received by the mechanical parameter measurement sensor 12 of the electronics unit 10, this being carried out in step 2. If the answer is yes, indicated by the symbol O, the method moves to the configuration mode suitable for the transmission of the mechanical waves. This is illustrated by the step bearing the reference 3 in FIG. 2. If the answer is no, indicated by the symbol N, a return is made to the emission step bearing the reference 1, described above.

In step 4, interrogation may take place to verify the presence of the external remote loading tool 40a to 40d which is applied in the proximity of the electronics unit 10, advantageously against the wheel 20, notably in the case of mechanical waves in the form of vibrations. For example, the electronics unit 10 may emit radio waves, given that the electronics unit 10 is currently using this emission mode, toward the external remote loading tool 40a to 40d or toward a monitoring unit 51a, 51b controlling the operation of the external remote loading tool 40a to 40d. Another emission mode is also possible, as will be detailed subsequently.

The external remote loading tool 40a to 40d or its monitoring unit 51a, 51b may then respond by emitting mechanical waves toward the electronics unit 10 in the second configuration mode suitable for sending mechanical waves. In order to validate the configuration for receiving mechanical waves according to this second configuration mode, the electronics unit 10 may emit at radiofrequency, toward the external remote loading tool 40a to 40d or its monitoring unit 51a, 51b, a message of validation of the configuration for receiving mechanical waves according to this second configuration mode.

If the response to this interrogation is yes (O), the method proceeds with the step of emission of at least one frame of mechanical waves 8, 8a by the external remote loading tool 40a to 40d toward the electronics unit 10, these waves being representative of the data to be remotely loaded, this step having been mentioned above as an essential step of the method and bearing the reference 5.

After this step 5 of emission of the data to be remotely loaded in the form of mechanical waves, the method may proceed to an interrogation 6 regarding the validation of the data. If the response to a validation of the data is no (N), the method returns to the step 5 of emission of the data to be remotely loaded in the form of mechanical waves, for the completion of the remotely loaded data.

If the response to a validation of the data is yes (0), the method moves to the end step 7 which restores the first, normal configuration mode, in place of the second configuration mode suitable for receiving the mechanical waves. The electronics unit 10 may emit a validation message at radiofrequency toward the external remote loading tool 40a to 40d or the monitoring unit 51a, 51b of the external remote loading tool 40a to 40d.

A number of frames of mechanical waves 8, 8a representative of the data to be remotely loaded may be emitted successively by the external remote loading tool 40a to 40d toward the electronics unit 10. These frames of mechanical waves 8, 8a may be fragmented according to the size of the memory of the electronics unit 10. The interrogation 6 serves to verify that all the frames of mechanical waves 8, 8a have actually been detected and received in the electronics unit 10.

FIG. 3 shows a mode of conversion of a frame of mechanical waves 8 into a frame of digital signals. The mechanical waves 8 are the raw data detected by the sensor, and the subsequent representations are the result, after filtering, of the low-pass type for example, of the shape of the signal, described as the envelope of the detected mechanical waves. The mechanical waves, for example vibrations in the form of acoustic pulses, are emitted periodically by the external remote loading tool 40a to 40d. In the top curve, the vibrations determine electrical signals, these signals framing the vibrations as closely as possible.

In the middle curve, under the top curve, an upper threshold 9a and a lower threshold 9b are determined for these electrical signals, the upper threshold 9a corresponding to a higher electrical signal amplitude than the lower threshold 9b. When an electrical signal exceeds the upper threshold 9a, this electrical signal corresponds to a digital signal of 1. The digital signal remains at 1 until the electrical signal falls below the lower threshold 9b. At this moment, the digital signal switches to 0.

The digital signal remains at 0 until the vibrations move back above the upper threshold 9a and the signal again becomes a digital signal of 1. This results in a frame of digital signals based on the frame of mechanical waves 8, 8a via the electrical signals. This is the case for a frame of pressure waves such as vibration waves.

With reference to FIG. 4, the invention also relates to an assembly comprising an external remote loading tool 40a to 40d and a wheel 20 of a motor vehicle 50. In FIG. 4, four remote loading tools 40a to 40d are shown simultaneously, but obviously it is not strictly necessary for four remote loading tools, whether different or not, to act simultaneously on respective wheels 20 of a motor vehicle.

However, it is possible to use an external remote loading tool 40a to 40d for each wheel 20 and to carry out the remote loading into the electronics unit 10 of each wheel 20 simultaneously. In this case, the remote loading tools are not necessarily different from each other, but are preferably of the same type.

Additionally, for the sake of clarity, in FIG. 4, in order to indicate clearly which receiving and emission modes are used between the electronics unit 10 and a specific external remote loading tool 40a to 40d, the remote loading tools are shown spaced apart from the associated wheels 20, although in most cases, and notably where vibration waves are used, the remote loading tools 40a to 40c should be applied against the wheels 20, which is not necessary for the remote loading tool 40d used for pressure waves.

The wheel 20 comprises a tire 22 and an electronics unit 10 for measuring at least one operating parameter of the wheel 20. According to the invention, remote loading of digital data takes place between an external remote loading tool 40a to 40d and an electronics unit 10, the remote loading tool 40a to 40d being external to the wheel 20.

In a known way, as mentioned above, the electronics unit 10, which may be fixed to the rim or the tire or to an inflation valve 23 of the tire of the wheel 20, inside the tire, comprises a microprocessor, a memory and at least one sensor 12 for measuring a mechanical parameter relating to the wheel 20. The external remote loading tool 40a to 40d may comprise elements for creating and emitting at least one frame of mechanical waves relating to the mechanical parameter measured by the sensor, based on the digital data to be remotely loaded.

The digital data may be sent to the external remote loading tool 40a to 40d by a monitoring unit 51a, 51b or by a server 51c, by any means of emission appropriate to the external remote loading tool 40a to 40d. The mechanical parameter measurement sensor 12 detects the emitted mechanical waves and communicates them to the microprocessor of the electronics unit 10 of the wheel 20.

The microprocessor of the electronics unit 10 of the wheel 20 comprises elements for converting the mechanical waves received by the sensor into digital signals representing the remotely loaded digital data, and elements for storing the remotely loaded digital data.

According to two preferred embodiments of the present invention, the mechanical parameter measurement sensor 12 is a radial acceleration sensor of the wheel 20 or a sensor for measuring the pressure of the tire of the wheel 20.

According to the first preferred embodiment, if the mechanical parameter measurement sensor 12 is the acceleration sensor of the electronics unit 10, the external remote loading tool is a cellphone 40a, a vibrating member 40c controlled by a central monitoring unit 51a, or a special-purpose tool 40b comprising elements for creating and emitting vibration waves. The external remote loading tool may also be a ground marking, in relief for example.

The emission time for the frame of mechanical waves 8, 8a is determined by the capacity of the remote loading tool 40a to 40d to supply data in the form of waves. An acoustic signal will be faster than a signal composed of pressure variations.

All these external remote loading tools, namely the cellphone 40a or computer, the vibrating member 40c and the special-purpose tool 40b, may preferably be applied against the wheel 20. The electronics unit 10 of each wheel 20 may comprise elements for emitting radio waves RF in return toward the central monitoring unit 51a, a diagnostic connection OBD with the special-purpose tool 40b, or emitting elements using a technology for wireless communication SF with the cellphone 40a, for example technologies known by the trade names of Wi-Fi® and Bluetooth®.

Any wheel unit 20 may correspond, in emission, by radio waves RF with a central monitoring unit of the wheels 51, and, in reception, by low frequency waves BF, this central monitoring unit of the wheels 51 being installed in the motor vehicle 50.

The cellphone 40a or the computer may receive the digital data via the internet I, from a server 51c, for example via 3G, 4G or GSM networks, or by means of wireless communication technologies such as Wi-Fi®, Bluetooth® and NFC®, although this list is not limiting.

According to the second preferred embodiment, if the mechanical parameter measurement sensor 12 is the pressure sensor of the electronics unit 10, the external remote loading tool is an external compressor 40d connected by a pipe to an inflation valve 23 of the tire 22 of the wheel 20.

The external remote loading tool 40d is not necessarily applied against the wheel 20, but must be placed in the proximity of the wheel 20. The external compressor 40d may be a controlled by an element for creating successive pressure variations 51b representative of the digital data to be remotely loaded, this element possibly being a monitoring unit similar to the aforementioned monitoring units.

In general terms, the present invention is applicable to any electronics unit 10 requiring data transfer or reprogramming, the electronics unit 10 being equipped with a sensor 12 for measuring a mechanical parameter that can be transmitted in the form of accelerometer waves, and more particularly to an electronics unit 10 to which access is difficult or impossible.

The invention claimed is:

1. A method for remotely loading digital data to an electronics unit (10) for measuring an operating parameter of a wheel (20) of a motor vehicle (50), the remote loading being carried out by a remote loading tool external to the wheel (20), the electronics unit (10) equipped with a microprocessor, a memory, and a sensor that measures a mechanical parameter relating to the wheel (20), the external remote loading tool configured to emit digital data to be received by the sensor of the electronics unit (10), the method comprising:

positioning the external remote loading tool in a proximity of the wheel (20);

emitting at least one frame of mechanical waves by the external remote loading tool toward the electronics unit (10), the mechanical waves being representative of the digital data to be remotely loaded to the electronics unit (10);

receiving the at least one frame of mechanical waves by the electronics unit (10) via the sensor, and converting the at least one frame of mechanical waves into electrical signals, followed by converting the electrical signals into digital signals containing the digital data; and storing the digital data in the electronics unit (10).

2. The method according to claim 1, wherein the at least one frame of mechanical waves emitted by the external remote loading tool is constituted by acoustic vibrations (8), and the sensor that receives the at least one frame of mechanical waves is a radial acceleration sensor of the wheel (20), the positioning of the external remote loading tool comprising applying the external remote loading tool against the wheel (20).

3. The method according to claim 1, further comprising: before the emitting of the at least one frame of mechanical waves by the external remote loading tool, receiving and storing, by the external remote loading tool, data in the form of digital signals, and wherein the emitting of the at least one frame of mechanical waves by the external remote loading tool includes conversion by the external remote loading tool of the data into mechanical waves that can be received by the sensor of the electronics unit (10).

4. The method according to claim 3, further comprising: before the emitting, by the external remote loading tool, of the at least one frame of mechanical waves representative of the digital data to be remotely loaded to the electronics unit (10), emitting a configuration frame of mechanical waves by the electronics unit (10) for configuring the electronics unit (10) to change operation from a first mode to a second mode that is suitable for reception of the mechanical waves representative of the digital data to be remotely loaded to the electronics unit (10).

5. The method according to claim 1, wherein the at least one frame is emitted as a plurality of frames of mechanical waves representative of the digital data to be remotely loaded to the electronics unit (10), said frames fragmented according to a size of the memory of the electronics unit (10).

6. The method according to claim 1, wherein the electronics unit transmits signals to the external remote loading tool by emission of electromagnetic waves.

7. An assembly, comprising:

an external remote loading tool; and an electronics unit (10) configured to be mounted on a wheel (20) of a motor vehicle (50), the electronics unit (10) configured to measure at least one operating parameter of the wheel (20), the remote loading tool being external to the wheel (20) of the motor vehicle (50), the electronics unit (10) comprising a microprocessor, a memory, and at least one sensor for measuring a mechanical parameter of the wheel (20) of the motor vehicle (50), the assembly configured to operate in accordance with the method according to claim 1 for remotely loading digital data to the electronics unit (10), the external remote loading tool comprising elements for creating and emitting mechanical waves relating to the mechanical parameter measured by the sensor based on the digital data to be remotely loaded, the sensor configured to receive the emitted mechanical waves and to communicate the emitted mechanical waves to the microprocessor, the microprocessor configured to convert the mechanical waves received by the sensor into digital signals representing the remotely loaded digital data for storing the digital data.

8. The assembly according to claim 7, wherein the sensor is a radial acceleration sensor of the wheel (20).

9. The assembly according to claim 7, wherein the sensor is an acceleration sensor, and the external remote loading tool is one selected from the group consisting of: a cellphone (40a), a vibrating member (40c) controlled by a central monitoring unit (51a), and a special-purpose tool (40b) comprising elements for creating and transmitting vibration waves, and wherein the electronics unit (10) of the wheel (20) comprises elements for emitting electromagnetic waves for wireless transmission to the external remote loading tool.

10. The assembly according to claim 7,
wherein the sensor is a pressure sensor, and
wherein the external remote loading tool is an external compressor (40d) connected to an inflation valve (23) of the tire (22) of the wheel (20), the external compressor (40d) controlled by an element for creating successive pressure variations (51b) representative of the digital data to be remotely loaded.

11. The method according to claim 1, wherein the at least one frame of mechanical waves emitted by the external remote loading tool is constituted by variations in pressure (8a) inside the tire, and the sensor that receives the at least one frame of mechanical waves is a pressure sensor of the tire (22).

12. The assembly according to claim 7, wherein the sensor is configured to measure a pressure of the tire (22) of the wheel (20).

13. The method according to claim 1, further comprising:
before the emitting of the at least one frame of mechanical waves by the external remote loading tool, emitting a configuration frame of mechanical waves by the electronics unit (10) for configuring the electronics unit (10) to change operation from a first mode to a second mode suitable for reception of the mechanical waves representative of the digital data to be remotely loaded to the electronics unit (10).

14. A method for remotely loading data into an electronics unit (10) of a wheel (20) of a motor vehicle (50), by way of a remote loading tool external to the wheel (20), for reprogramming the electronics unit (10), the electronics unit (10) equipped with a microprocessor, a memory, and a sensor that measures a mechanical parameter relating to the wheel (20), the method comprising:
positioning the external remote loading tool in a proximity of the wheel (20);
converting, at the external remote loading tool, digital data to be remotely loaded to the electronics unit into at least one frame of mechanical waves, and emitting the at least one frame of mechanical waves from the external remote loading tool toward the electronics unit (10) located inside a tire (22) of the wheel (10), the digital data configured for reprogramming the electronics unit (10); and
receiving the at least one frame of mechanical waves at the electronics unit (10), via the sensor, and converting the at least one frame of mechanical waves into electrical signals, followed by converting the electrical signals into digital signals containing the digital data, and storing the digital data in the memory of the electronics unit (10) for reprogramming the electronics unit (10).

15. The method according to claim 14, further comprising:
prior to the converting, at the external remote loading tool, the digital data into at least one frame of mechanical waves, emitting a configuration frame composed of mechanical waves from the external remote loading tool toward the electronics unit (10); and
upon receipt of the composed of mechanical waves by the sensor of the electronics unit (10), changing an operational mode of the electronics unit from a first mode to a second mode suitable for reception of the at least one frame of mechanical waves.

16. The method according to claim 14,
wherein the at least one frame of mechanical waves are emitted by the external remote loading tool as acoustic vibrations, and the sensor that receives the at least one frame of mechanical waves is a radial acceleration sensor that monitors a radial acceleration of the wheel (20), and
wherein positioning the external remote loading tool comprises applying the external remote loading tool against the wheel (20).

17. The method according to claim 14,
wherein the at least one frame of mechanical waves are emitted by the external remote loading tool as variations in pressure (8a) inside the tire, and the sensor that receives the at least one frame of mechanical waves is a pressure sensor of the tire (22), and
wherein positioning the external remote loading tool comprises connecting an external compressor to an inflation valve of the tire of the wheel, and controlling the external compressor to create successive pressure variations representative of the digital data.

18. The method according to claim 14, further comprising:
validating the digital data received at the electronics unit (10) received via the at least one frame of mechanical waves, and in the event that the validation is not successful, repeating the emitting of the at least one frame of mechanical waves from the external remote loading tool.

19. The method according to claim 14, further comprising:
transmitting, from the electronics unit, signals constituted by electromagnetic waves to the external remote loading tool.

* * * * *